(12) United States Patent
O'Brien et al.

(10) Patent No.: US 8,131,666 B2
(45) Date of Patent: Mar. 6, 2012

(54) CONTEXT-BASED USER AUTHENTICATION, WORKFLOW PROCESSING, AND DATA MANAGEMENT IN A CENTRALIZED APPLICATION IN COMMUNICATION WITH A PLURALITY OF THIRD-PARTY APPLICATIONS

(75) Inventors: Edward O'Brien, Attleboro, MA (US); David Pett, Hingham, MA (US)

(73) Assignee: FMR LLC, Boston, MA (US)

( * ) Notice: Subject to any disclaimer, the term of this patent is extended or adjusted under 35 U.S.C. 154(b) by 616 days.

(21) Appl. No.: 12/255,590

(22) Filed: Oct. 21, 2008

(65) Prior Publication Data

US 2010/0115612 A1     May 6, 2010

(51) Int. Cl.
*G06F 7/00* (2006.01)
*G06F 17/00* (2006.01)

(52) U.S. Cl. .......................................... 707/608; 726/22
(58) Field of Classification Search .................. None
See application file for complete search history.

(56) References Cited

U.S. PATENT DOCUMENTS 5,692,132 A * 11/1997 Hogan ........................ 705/26.41

(Continued)

OTHER PUBLICATIONS

"Schwab Announces PortfolioCenter for Investment Advisors," Business Wire, available at http://www.findarticles.com, Sep. 30, 2002, 3 pages.
Schwab Portfolio Technologies® Brochure, Charles Schwab & Co., Sep. 2008, 16 pages.

(Continued)

*Primary Examiner* — Khanh Pham
*Assistant Examiner* — Azam Cheema
(74) *Attorney, Agent, or Firm* — Proskauer Rose LLP

(57) ABSTRACT

Described are computer-based methods and apparatuses, including computer program products, for providing context-based user authentication, workflow processing and data management in a centralized application in communication with a plurality of third-party applications. Changed data from a first third-party application is received by a centralized application. The changed data is processed by the centralized application. The processing comprises determining an urgency type, a second third-party application to which at least a portion of the data is applicable, mapping the data to a second third-party application data structure, and generating a request including the data structure and based on the urgency type and the second third-party application. The request is sent to the second third-party application. Data in a database associated with the centralized application is updated based on the changed data.

20 Claims, 8 Drawing Sheets

U.S. PATENT DOCUMENTS

| | | | |
|---|---|---|---|
| 6,826,696 | B1 | 11/2004 | Chawla et al. ............... 713/201 |
| 7,099,834 | B2 * | 8/2006 | Dutta et al. .................. 705/27.1 |
| 7,134,137 | B2 | 11/2006 | Joshi et al. ........................ 726/1 |
| 7,693,988 | B2 * | 4/2010 | Barsness et al. ............. 709/225 |
| 2001/0037451 | A1 | 11/2001 | Bhagavatula et al. ........ 713/155 |
| 2003/0130958 | A1 * | 7/2003 | Narayanan et al. ............ 705/73 |
| 2003/0229783 | A1 | 12/2003 | Hardt .......................... 713/155 |
| 2004/0250118 | A1 | 12/2004 | Andreev et al. .............. 713/201 |
| 2004/0254885 | A1 * | 12/2004 | Gernold .......................... 705/51 |
| 2005/0125285 | A1 | 6/2005 | McQueeney et al. .......... 705/14 |
| 2006/0179003 | A1 * | 8/2006 | Steele et al. .................... 705/59 |
| 2006/0271689 | A1 | 11/2006 | Kikuchi ....................... 709/227 |
| 2007/0174193 | A1 | 7/2007 | Quan et al. ..................... 705/44 |
| 2007/0282724 | A1 * | 12/2007 | Barnes et al. .................. 705/35 |
| 2008/0133612 | A1 * | 6/2008 | Liu et al. ...................... 707/201 |
| 2009/0138528 | A1 * | 5/2009 | Manzano ...................... 707/203 |
| 2009/0198772 | A1 * | 8/2009 | Kim et al. .................... 709/203 |
| 2011/0016025 | A1 * | 1/2011 | Gaisford ..................... 705/27.1 |

OTHER PUBLICATIONS

"Power Advisor™—Product Features and Specifications," available from http://www.poweradvisortools.com/products/features.html, undated, 2 pages.

J. Bruckenstein, "Portfolio Management Tools Get Better," available from http://advisor.morningstar.com/articles/article.asp?docId=3786, Sep. 9, 2004, 4 pages.

InvestEdge Solutions, available at http://www.investedge.com, 2008, 6 pages.

FCSI—dbCAMS+, available at http://www.fcsi.com/products/Dbcams.htm, 2008, 1 page.

Captools/net™, available at http://www.captools.com/captoolsnet.htm, undated, 3 pages.

B. Southall, "Fidelity's 'better mousetrap' fails to get the competition to squeal," InvestmentNews, available at http://www.investmentnews.com, Apr. 18, 2005, 3 pages.

International Search Report and the Written Opinion of the International Searching Authority for International Application No. PCT/US08/80654, mailed Dec. 19, 2008.

* cited by examiner

ACME Wealth Advisors: Client Metrics

Total Clients 111 | Total Account Value $462,287,013

⊞ View All Details | Updated as of Dec. 05, 2007

ACME Wealth Advisors: Assets Under Management

| Equity | Fixed Income | Short-term | Other/Unknown |
|---|---|---|---|
| 50% | 30% | 15% | 5% |
| $231,143,506 | $138,686,103 | $69,343,051 | $23,114,350 |

⊟ Hide All Details | Updated as of Dec. 05, 2007

| Asset Class | % Portfolio | Value |
|---|---|---|
| Equity | 55% | $62,608,014 |
| Fixed Income | 30% | $34,149,826 |
| Short-Term | 10% | $11,383,275 |
| Other/Unknown | 15% | $5,891,638 |
| | 100.00% | $113,832,753 |

Important Legal Information

ACME Wealth Advisors: Top 10 Holdings

Updated as of Dec. 05, 2007

| Security ID | Description | Closing Mkt Value ▼ | Closing Price | Recent Price |
|---|---|---|---|---|
| | ISHARES TR RUSSELL | | | |

Copyright 1998 - 2008 FWR Corp. All rights reserved.

WealthCentral News & Events

Learn the "Secrets of the Fastest Growing Firms"

[Watch] a replay of the webinar

——— INTRODUCING ———
Fidelity Practice Management Program

[Learn More] Discover more powerful ways to manage your practice

WHAT'S NEW
· Market Volatility: Viewpoints to Consider
· Introducing Streamlined Data from Reuters
· Investment and Economic Insight
· Separate Account Network adds New Managers
· New Form for Easier Conversions on Retail FIDELITY FLASH
· Weekly Flash (08-15)
· Fidelity Flash Archives HOT LINKS
· Event Calendar
· Policies & Procedures
· Retirement Business Resource
· Fidelity Webinars Fidelity WealthCentral | Support ▼ | Log Out Clients | Groups | Accounts Welcome John Smith Tools | Research | Imports & Exports ▼ | Settings ▼ | Service | Trade | Reports | Resources 4 New Messages Customize View Edit with Notepad Terms of Use | Privacy | Security

CONTEXT-BASED USER AUTHENTICATION, WORKFLOW PROCESSING, AND DATA MANAGEMENT IN A CENTRALIZED APPLICATION IN COMMUNICATION WITH A PLURALITY OF THIRD-PARTY APPLICATIONS

FIELD OF THE INVENTION

The present invention relates generally to computer-based methods and apparatuses, including computer program products, for providing context-based user authentication, workflow processing, and data management in a centralized application in communication with a plurality of third-party applications.

BACKGROUND

A registered investment advisor ("RIA") plays a critical role in managing the portfolio of an individual investor-client. The advisor must, at the very least, be able to review the asset allocation of the client, forecast the risks and benefits of alternative allocation scenarios, execute trades and transfers of the client's assets, and update the client's personal information. These responsibilities require the advisor to gather and utilize a vast array of data, from general market and business analytics to real-time asset valuation to specific client characteristics.

Often, the diffuse nature of the sources providing this data and the repositories which hold it leads the advisor to rely on a multitude of different providers, each offering a discrete and separate application. These applications are frequently insulated from each other so that they cannot communicate easily or effectively to share information. Thus, the advisor must maintain separate log-in credentials for each application as well as ensure that redundant data across each application does not get out of sync. Also, the advisor must have each application available at his or her workstation, requiring time-consuming installation and configuration of each application.

Some providers offer a single application that purports to cover all of the tasks and data needed by the advisor. However, this type of application normally has a very limited set of functions and does not contain the robust features of the individual 'best-of-breed' applications in areas such as customer relationship management (CRM), financial planning, portfolio management, and rebalancing. Some advisors construct customized interfaces between the separate third-party applications they utilize. However, these customized interfaces require intensive modification by the advisor when newer versions of the third-party applications are released.

Therefore, it would be desirable to create a centralized application that can provide one-time user authentication, presentation of data in a common context, workflow connectivity, and synchronous data management across a multitude of discrete third-party applications. Such a centralized application would provide cost savings and work efficiency improvements for the registered investment advisor.

SUMMARY OF THE INVENTION

The description describes methods and apparatuses, including computer program products, for a centralized application for context-based user authentication, workflow processing, and data management in a centralized application in communication with a plurality of third-party applications. The description includes techniques that can be used to advantageously provide context-based user authentication, workflow processing, and data management in an environment containing a centralized application in communication with a plurality of third-party applications.

In one aspect, there is a computerized method for context-based user authentication, workflow processing, and data management in a centralized application in communication with a plurality of third-party applications. Changed data from a first third-party application executing on a second computing device is received by a centralized application executing on a first computing device. The centralized application processes the changed data. The processing includes determining an urgency type of the changed data, determining a second third-party application executing on a third computing device to which a portion of the changed data is applicable, and mapping the changed data to a data structure associated with the second third-party application. A request including the data structure is generated based on the urgency type and the second third-party application. The request is sent to the second third-party application based on the urgency type. Data is updated in a database associated with the centralized application based on the changed data.

In another aspect, there is a system for context-based user authentication, workflow processing, and data management in a centralized application in communication with a plurality of third-party applications. The system includes a centralized application server executing a centralized application and a plurality of third-party application servers executing a plurality of third-party applications. The centralized application receives changed data from a third-party application. The centralized application processes the changed data. The processing includes means for determining an urgency type of the changed data, means for determining a second third-party application executing on a third computing device to which a portion of the changed data is applicable, and means for mapping the changed data to a data structure associated with the second third-party application. The processing further includes means for generating a request including the data structure based on the urgency type and the second third-party application. The processing further includes means to send the request to the second third-party application based on the urgency type. The processing further includes means for updating data in a database associated with the centralized application based on the changed data.

In another aspect, there is a computer program product for context-based user authentication, workflow processing, and data management in a centralized application in communication with a plurality of third-party applications. The computer program product is tangibly embodied in an information carrier. The computer program product includes instructions being operable to cause data programming apparatus associated with a first computing device to receive changed data from a first third-party application executing on a second computing device and process the changed data. The processing includes determining an urgency type of the changed data, determining a second third-party application executing on a third computing device to which a portion of the changed data is applicable, and mapping the changed data to a data structure associated with the second third-party application. A request including the data structure is generated based on the urgency type and the second third-party application. The request is sent to the second third-party application based on the urgency type. Data is updated in a database associated with the centralized application based on the changed data. In some examples, updating the data can comprise mapping at least a portion of the changed data to a data structure associated with the centralized application.

In some examples, any of the aspects above can include one or more of the following features. A user request can be received by the centralized application. The user request can include context data associated with the centralized application, a second third-party application, or both. A user interface associated with the centralized application can be displayed based on the context data. The context data can include account data, person data, group data, and/or household data.

In other examples, user credentials associated with a second third-party application can be determined without any additional user input. The credentials can be sent to the second third-party application. User access to data structures and/or functionality associated with the second third-party application can be determined without any additional user input. In some examples, the database associated with the centralized application can comprise a subset of data common to the centralized application and a plurality of third-party applications.

In other examples, the plurality of third-party applications can include a customer relationship management (CRM) application, a financial planning application, a portfolio management application, a modeling and/or rebalancing application, or any combination thereof.

In some examples the urgency type can include a batch type, an on-demand type, and a real-time type. Determining the urgency type can include determining the urgency type based on at least one business rule. Determining the urgency type is a batch type can comprise processing the changed data and sending the changed data to the second third-party application at a later time. Determining the urgency type is an on-demand type can comprise processing the changed data and making the changed data available to the second third-party application upon request. Determining the urgency type is a real-time type can comprise processing the changed data and sending the changed data to the second third-party application substantially instantaneously.

In other examples, the centralized application, the first third-party application, and the second third-party application are owned and/or hosted by separate unrelated entities. The centralized application, the first third-party application, and the second third-party application communicate across a communications network. The first and/or second third-party applications store data in corresponding databases.

In some examples, requests are received from a plurality of third-party applications using a Web Services paradigm. Data is transmitted to and from a plurality of third-party applications using a Web Services paradigm.

In other examples, a conflict between the changed data and data associated with the centralized application is determined. The conflict is reconciled according to at least one business rule. In some examples, separate user access to databases associated with the first and second third-party applications is enabled without requiring a first user access to the centralized application. In other examples, data is received by the centralized application from the first and/or second third-party applications. Without any user input, the centralized application fills a pre-defined form with the data and presents the form to the user.

Any of the examples described herein can include one or more of the following advantages. The advisor can create a secure access session with each of the third-party applications directly from the centralized application, without having to supply authentication credentials to each third-party application. The data stored by each third-party application can be managed and synchronized by the centralized application, thereby eliminating the possibility of incorrect or incomplete data across each of the individual application databases. Data can be updated with different urgencies, increasing the available processing capacity and efficiency of the individual applications and databases. The advisor can quickly access information in each third-party application in the same context as he or she was viewing in the previous application.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

FIG. 5 is a screenshot of an exemplary user interface of a third-party application to display information associated with context data from the centralized application.

FIGS. 6A-6C are screenshots of exemplary graphical user interfaces generated by the centralized application.

DETAILED DESCRIPTION

Figure 1:
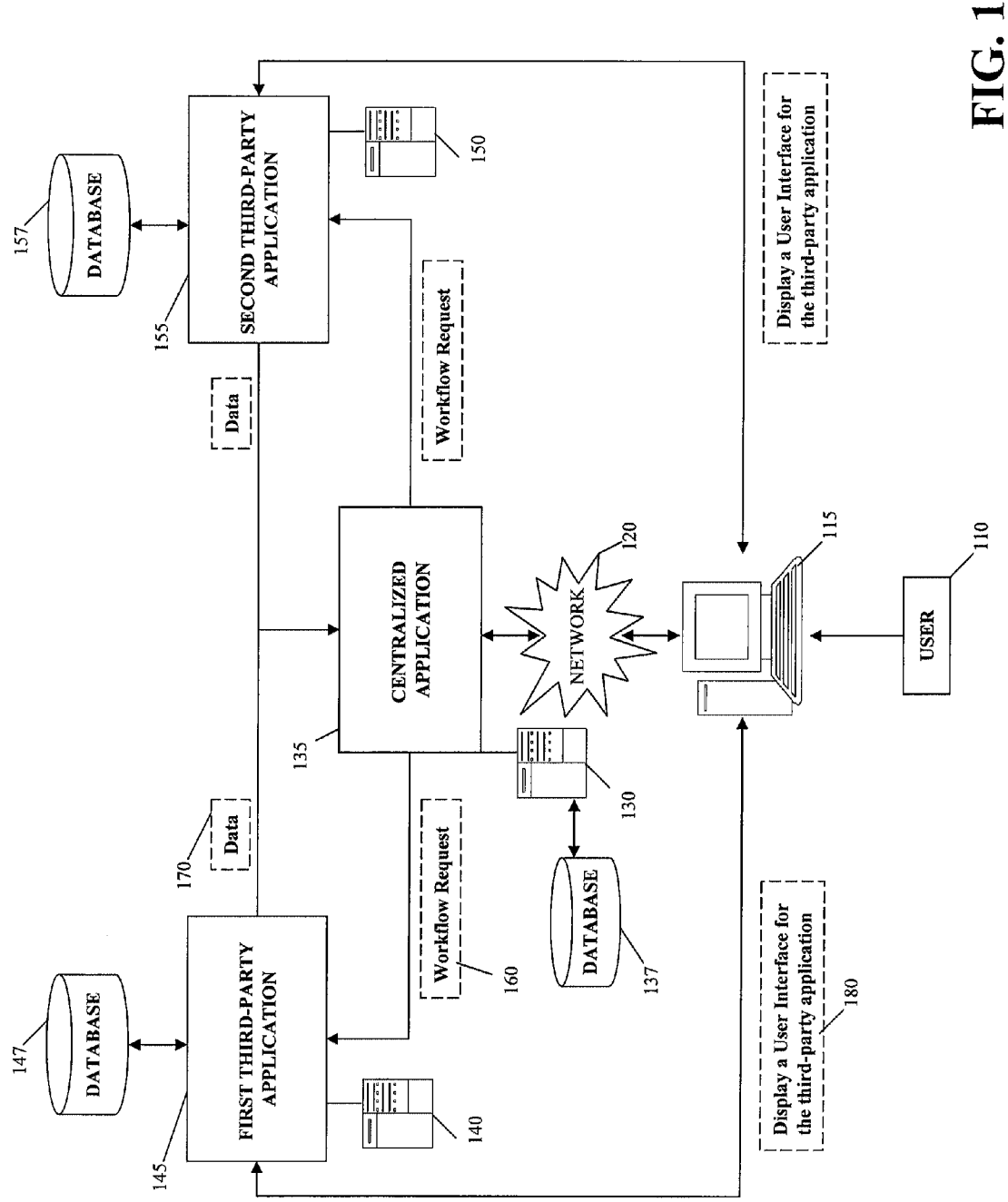
FIG. 1 is a block diagram of an exemplary system for providing context-based user authentication, workflow processing and data management in a centralized application in communication with a plurality of third-party applications.

FIG. 1 is a block diagram of an exemplary system 100 for providing context-based user authentication, workflow processing, and data management in a centralized application 135 in communication with a plurality of third-party applications 145 and 155. In FIG. 1, system 100 includes a first computing device 115, a communications network 120, a centralized application server 130 hosting a centralized application 135, and a plurality of third-party application servers 140 and 150. The third-party application servers 140 and 150 each host a separate unrelated third-party application 145 and 155. The third-party applications 145 and 155 each communicate with individual databases 147 and 157, respectively. In some examples, the centralized application 135 communicates with a centralized database 137. In some examples, the centralized database 137 can hold a subset of data that is common to the centralized application 135 and the plurality of third-party applications 145 and 155. The computing device 115, the centralized application server 130, the third-party application servers 140 and 150 and related databases 137, 147 and 157 are connected, as appropriate, directly or through a communications network, for example, communications network 120. The databases 137, 147 and 157 can reside on the same application server 130, 140 and 150 as the associated application, 135, 145 and 155, respectively.

The centralized application 135 and the first and second third-party applications 145 and 155 can be owned and/or hosted by separate unrelated entities. For example, the centralized application 135 can be an application that provides data aggregation from multiple centralized and third-party sources, user authentication and workflow processing for a plurality of third-party applications, account summary and detail information (e.g., current holdings, transaction history, etc.), account service requests, real-time market updates, business form creation and pre-filling, security cross-referencing, advisor alert management, financial market news and events, securities trading capabilities, cashiering, email and/or messaging services, retirement planning tools and calculators, and other similar functionality. The centralized application 135 can be an application that provides information reporting capabilities. For example, the centralized application 135 can be Wealth Central® offered as a web service by Fidelity Investments® of Boston, Mass. The third-party applications 145, 155, and others not shown can be applications in the areas of customer relationship management (CRM), financial planning, portfolio management, and modeling and/or rebalancing. The CRM application can be an application that provides operations such as, for example, prospect and client management, account, asset and product management, email capabilities, meeting notices, calendar and task reminders, sales workflow and analytics, sales force automation, competitor tracking, customer service, marketing, and other similar functionality. The CRM application can be an application that provides information reporting capabilities. For example, the third-party application can be a CRM application, such as Oracle® On Demand CRM offered as a web service by Oracle® Corp. of Redwood Shores, Calif. The financial planning application can be an application that provides operations such as, for example, financial needs assessment, estate planning, stock option modeling, federal & state tax calculations, goal planning, insurance analysis, asset allocation, cash flow management, small business planning, Monte Carlo analysis, and other similar functionality. The financial planning application can be an application that provides information reporting capabilities. For example, the third-party application can be a financial planning application, such as EISI Naviplan offered as a web service by Emerging Information Systems, Inc. of Carlsbad, Calif. The portfolio management application can be an application that provides operations such as, for example, portfolio performance analytics, performance history, exposure and risk measurement, benchmarking, comparison against financial indexes, portfolio accounting, securities coverage and support, and other portfolio management functionality. The portfolio management application can be an application that provides information reporting capabilities. For example, the third-party application can be a portfolio management application, such as Advent® Portfolio Exchange (APX) offered as a web service by Advent® Software, Inc. of San Francisco, Calif. The modeling and/or rebalancing application can be an application that provides operations such as, for example, multi-factored risk modeling, tax-sensitive optimization of a portfolio, long/short strategies, batch processing of multiple portfolios, taxonomic mapping of securities, and other similar functionality. The modeling and/or rebalancing application can be an application that provides information reporting capabilities. For example, the third-party application can be a modeling and/or rebalancing application, such as Open Optimizer and Risk Models offered as a web service by Northfield Information Services, Inc. of Boston, Mass.

A user 110 (e.g., a registered financial advisor) utilizes a first computing device 115 (e.g., laptop, personal digital assistant) of the system 100 to access a user interface of the centralized application 135 executing on a second computing device 130 (e.g., a Web server) in which the user can, for example, review and act on user and/or customer information related to the accounts, groups, persons, and/or households managed by the user 110 (e.g.; a registered financial advisor is reviewing his total assets under management, or the market performance of a customer's account). The user 110 can, for example, retrieve up-to-date market information, review the current top-ten holdings of the user's 110 customer base, or see an overview of the user's total assets under management. The user 110 can, for example, review unread messages, change settings of the centralized application 135, or review support documents associated with the centralized application 135. The user 110 can also select from numerous menu options to view more detailed aspects of the available information. The menu options can be, for example, links to functionality within the centralized application 135 or links to one or more of the third-party applications 145 and 155.

In some examples, the menu options that link to one or more of the third-party applications 145 and 155 can be designated as 'deep links'. Deep links provide a direct path to specific information in a Web application requested by the user, instead of requiring the user to navigate to the home page and drill down to reach the same information. One example of a deep link is a hyperlink in one Web application that points to a specific page in a different Web application (e.g., http://en.wikipedia.org/wiki/Computer), instead of pointing to the default home page of the different Web application (http://en.wikipedia.org). Another example of a deep link is a hyperlink in one Web application that points to a specific page in a different Web application and also includes context data which the different Web application can use as a basis for retrieving information from its associated database and present that information to the user.

As one example, Nicole Advisor sits down at her computer and logs in to the centralized application 135. She wants to view the current account information for her newest customer, Tom Jones. She selects, for example, a Clients menu option and a Recently Viewed Clients window appears. The first option in the Recently Viewed Clients window is 'Jones, Tom'. Nicole selects that option, and the centralized application 135 presents her with a user interface showing an account summary for Tom. Now, Nicole remembers Tom has just moved to a new apartment, so his address information needs to be updated. Nicole clicks on the Tools menu and selects the CRM menu option. The centralized application 135 generates a request 160 to a third-party CRM application which includes the HTTP address of the third-party CRM application server and the current context of the centralized application—in this case, the context is Nicole's customer Tom Jones. The centralized application 135 sends the request 160 to the third-party CRM application 145 over a communications network, and a user interface 180 for the CRM application 145 appears on Nicole's screen. The user interface 180 is generated by the third-party application 145 and bases on the context data supplied in the request 160, the user interface 180 directly displays a Client Detail screen containing the personal information of Tom Jones, instead of displaying a generic home page at which Nicole must search for Tom's client detail.

In some examples, the centralized application 135 can receive data 170 from a first third-party application 145. The data 170 can be changed by the third-party application 145 and sent to the centralized application 135 for updating. The centralized application 135 can process the data 170 by determining its urgency type (e.g., batch, on-demand, real-time), determining a second third-party application 155 to which at least a portion of the data 170 is applicable, and mapping the data 170 to a data structure associated with the second third-party application 155. The centralized application 135 can generate a request 160 based on the urgency type and the second third-party application 155, and include the data structure. The centralized application 135 can send the request 160 to the second third-party application 155 based on the urgency type. The centralized application 135 can update data in a database 137 associated with the centralized application 135 based on the changed data 170.

In some examples, the centralized application 135 can receive data 170 from a third-party application 145 and 155 and fill a pre-defined form with the data 170 without any user input. The pre-defined forms can include individual account applications, name changes, margin account applications, user authorizations, tax notifications, and other form types. The forms can be displayed to the user in Microsoft® Word, Adobe® Acrobat, and other similar word processing and/or document viewing applications. For example, Nicole Advisor just received an email from a prospect. The prospect informs Nicole that he wants to open a brokerage account with Nicole as his advisor. Nicole logs in to the centralized application 135, opens the Service menu, and selects the Forms Library link. She chooses the Individual Account Application form, and the centralized application 135 presents a search window where Nicole can find her prospect by name. Nicole enters the name of the desired prospect. The centralized application 135 receives data 170 from a third-party application 145, in this case, a CRM application, and populates a results field with a list of prospects matching the search criteria she entered. She selects the prospect and a standardized Account Application form appears in the centralized application 135, complete with the prospect's personal information pre-filled into the appropriate fields and without requiring Nicole to manually enter any information into the form.

In some examples, the centralized application 135 can receive requests from a first and/or second third party application 145 and 155 using a Web Services paradigm and can send data to a first and/or second third-party application 145 and 155 using a Web Services paradigm. A Web Services paradigm can utilize technologies such as, for example, Extensible Markup Language (XML), Simple Object Access Protocol (SOAP), and Web Services Definition Language (WSDL). Other similar Web Services technologies and approaches will be understood and appreciated by one skilled in the art.

The information presented by the centralized application 135 can be stored in a database 137. The database 137 can reside on the same application server 130 as the centralized application 135 or it can communicate with the centralized application server 130 via a communications network 120.

In some examples, the user 110 can provide user credentials on a log-in screen of the centralized application 135 in order to gain access to the functionality of the centralized application 135. Once the user 110 has provided valid credentials, the centralized application 135 can determine the scope of functionality and data to which the user 110 has access, both within the centralized application 135 and within the third-party applications 145 and 155. For example, when the user 110 provides valid credentials to the centralized application 135, the centralized application 135 determines which third-party applications 145 and 155 the user is allowed to access. This determination can be made by retrieving authorization data from a database or other similar technologies. Further, the centralized application 135 determines what data structures and/or functionality, such as specific features, specific pages, specific accounts, and the like, that the user is authorized to access for each of the third-party applications the user is authorized to access. For example, Nicole Advisor logs in to the centralized application 135 by entering her user ID and PIN in the appropriate fields, and clicking the "Log In" button. After Nicole clicks the button, the centralized application 135 compares the user credentials she entered against pre-stored user credentials for her user account in the centralized application database 137. The centralized application 135 can authenticate the credentials and grant Nicole access, presenting her with the main page of the centralized application 135. At the same time, the centralized application 135 can retrieve a list of authenticated third-party applications 145 and 155 that Nicole can access through her user account. The centralized application 135 can send Nicole's user credentials to these third-party applications 145 and 155 and receive responses from the third-party applications. The centralized application 135 can include within its user interface deep links and other mechanisms Nicole can utilize to communicate with the third-party applications 145 and 155. The centralized application 135, for example, would not present Nicole with any options for third-party applications to which she does not have the requisite access.

The centralized application 135 can also determine, for example, to which information and/or functionality Nicole has access in the third-party applications 145 and 155. For example, upon logging in to the centralized application 135, Nicole can navigate to a specific account group page showing her information related to a particular grouping of customer accounts (e.g., "Aggressive Growth"). At this point, Nicole wants to view a current Appraisal Report for the Aggressive Growth account group. Nicole can click on the Group name (or an icon located next to the Group name) and mouse over the Portfolio Management menu option from the drop-down menu that appears. A submenu can appear, and Nicole can select the Appraisal Report option which comprises a deep link to the third-party Portfolio Management application 145. Because Nicole's user account had been allowed access to this information in the third-party application 145, a new user interface window appears and she can view the Appraisal Report. Alternatively, if Nicole's user account had not been allowed access to this information in the third-party application, she would not have seen a deep link in the centralized application 135 to the Appraisal Report for that Account Group.

Figure 2:
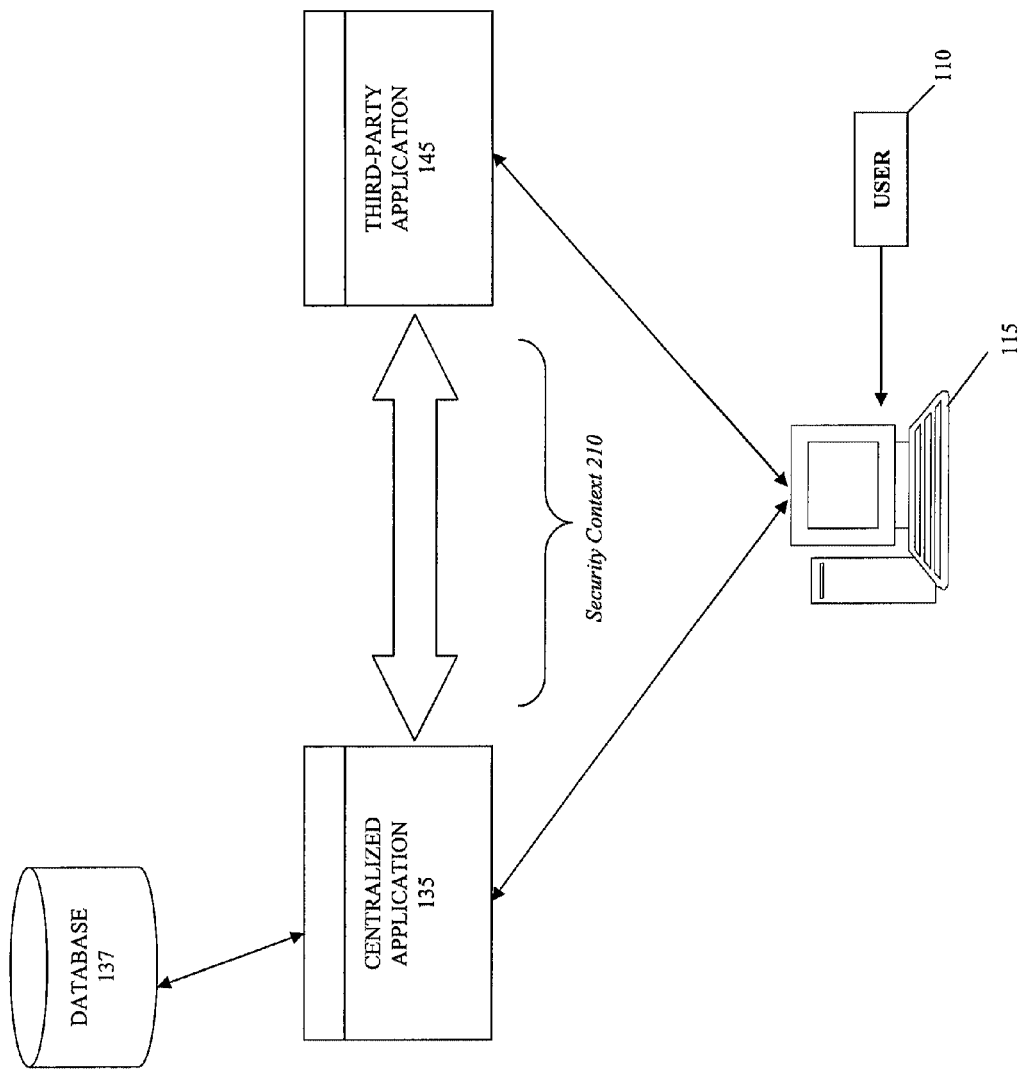
FIG. 2 is a block diagram of another exemplary system for providing context-based user authentication, workflow processing and data management in a centralized application in communication with a plurality of third-party applications.

FIG. 2 is an exemplary block diagram for determining user credentials associated with a third-party application 145 and 155 without any additional user input through the system of FIG. 1. The user 110 provides user credentials associated with the centralized application 135 using a user interface on the computing device 115. The centralized application 135 receives the user credentials and can compare them with previously stored credential data (for example, in a database 137) for that user to ensure the credentials are valid. The centralized application 135 can also retrieve a set of third-party applications 145 and 155 which the user 110 can access, including the allowed functionality and data within the third-party applications 145 and 155. The user credentials can include, for example, a user ID, username, password, pass code, personal identification number (PIN), encryption key, certificate, or other similar authentication data. Previously stored credential data can include, for example, data stored in database fields and/or tables, flat files, certificates, or other similar data.

Some examples use a Single Sign-On (SSO) paradigm using a protocol such as Security Assertion Markup Language (SAML). For example, when the user 110 links to a third-party application 145 and 155 from within the centralized application 135, the centralized application 135 sends a request for a specific Web page at the third-party application 145 and 155. The third-party application 135 can respond to the request by sending, for example, an Extended Hypertext Markup Language (XHTML) form to the centralized application 135. The centralized application 135 then generates a SAML request, including credentials associated with the user, to an SSO service hosted at the third-party application 145. If the centralized application 135 does not currently have a valid security context 210 for the user 110 with the third-party application 145, the SSO service validates the request and sends a response to the centralized application 135. The centralized application 135 then generates a request to the third-party application 145. The third-party application 145 then creates a security context 210 for the user 110 with the centralized application 135, and redirects the user 110 to the specific Web page requested. Because the user 110 has already authenticated herself to the centralized application 135, the user does not need to enter any additional data and/or credentials associated with the third-party application 145. For example, the centralized application 135 can have any additional data and/or credentials associated with the third-party application 145 stored in its database 137. Any subsequent requests made by the centralized application 135 to the third-party application 145 on behalf of the user 110 and while the security context 210 exists do not require any additional user input. An advantage to this example is that the user 110 can seamlessly transition between the centralized application 135 and the third-party application 145 without having to continually re-enter her user credentials.

Figure 3:
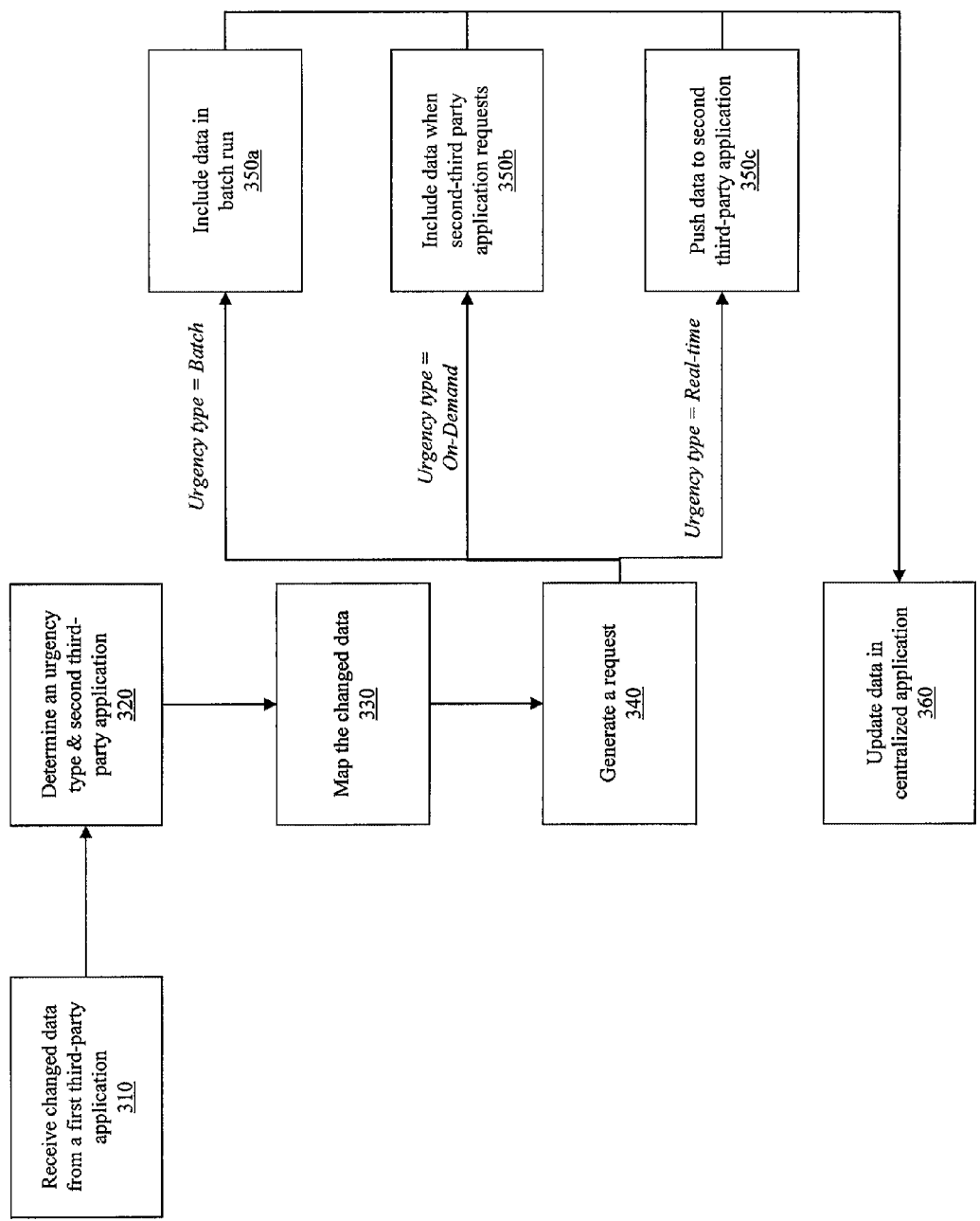
FIG. 3 is an exemplary process diagram for determining data updates associated with one or more third-party applications.

FIG. 3 is an exemplary flowchart 300 of a method providing context-based user authentication, workflow processing and data management in a centralized application 135 in communication with a plurality of third-party applications 145 and 155 through the system of FIG. 1. The centralized application 135 receives (310) changed data from a first third-party application 145. The centralized application 135 determines (320) an urgency type of the changed data. Urgency types, as an example, can be assigned to data based on whether the data is prone to change during the day (e.g., stock price quotes), referred to as a real-time urgency type, whether it needs to be changed in other systems to ensure data uniformity and avoid confusion when the applicable third-party needs it (e.g., customer mailing address), referred to as a on-demand urgency type, or whether it can remain unchanged until a convenient time to change (e.g., previous day's market closing value need not be change until the following day), referred to as a batch urgency type.

The centralized application 135 also determines (320) a second third-party application 155 to which at least a portion of the changed data 170 is applicable. For example, the centralized application 135 receives (310) an updated customer mailing address and updated customer telephone number from a first third-party application 145, for example from a CRM third-party application. The centralized application 135 determines (320) that the customer mailing address and telephone number are also maintained in a database 157 associated with a second third-party application 155, for example a portfolio manager application.

In some examples, however, the second third-party application 155 utilizes data structures that are different from both the centralized application 135 and the first third-party application 145. The centralized application 135 maps (330) the changed data to a data structure associated with the second third-party application 155. Mapping techniques might include, for example, XML, flat file, Electronic Data Exchange (EDI) or other similar technologies. As an example, the first third-party application 145 might use a String data structure to store the customer telephone number, while the second third-party application 155 might use three separate Number data structures to store the telephone number (e.g., area code, first set of three digits, and second set of four digits). The centralized application 135 can, for example, parse the String data structure of the first third-party application 145, extract the three separate parts of the telephone number, and create three separate Number data structures according to the requirements of the second third-party application 155.

The centralized application 135 generates (340) a request based on the urgency type of the changed data 170 and the second third-party application 155. For example, for a real-time urgency type, the centralized application 135 can generate an immediate request to push the data. For a batch urgency type, the centralized application 135 can generate a request to be included in a batch run that will submit all of the batched data at a convenient time, such as in the middle of the night at a low traffic time. For an on-demand urgency type, the centralized application 135 can generate a request to be included when the second third-party application 155 requests the data that has been updated. The request includes the changed data 170, which has been mapped (330) to a data structure associated with the second third-party application 155. The centralized application 135 sends the request to the second third-party application 155 across a communications network 120 according to the urgency type. For example, for a real-time urgency type, the centralized application 135 generates an immediate request to push (350c) the data. For a batch urgency type, the centralized application 135 generates a request to be included in a batch run (350a) that will submit all of the batched data at a convenient time, such as in the middle of the night at a low traffic time. For an on-demand urgency type, the centralized application 135 generates a request to be included (350b) when the second third-party application 155 requests the data that has been updated. As can be appreciated, the term request in this context is used broadly to represent any format of the delivery of the updated data according to its urgency type.

The centralized application 135 also updates (360) data in a database 137 associated with the centralized application 135 based on the changed data 170. For example, the centralized application 135 can simply update (360) data fields in the database 137 that correspond to the changed data 170. In some examples, a database 137 associated with the centralized application 135 utilizes data structures that are different from the first third-party application 145. The centralized application 135 can process at least a portion of the changed data 170 by mapping that portion to a data structure associated with the centralized application 135 and then updating (360) an associated database 137 with the data structure.

In some examples, the user 110 can access databases 147 and 157 associated with the first and second-third party applications 145 and 155 without requiring a first access to the centralized application 135. For example, if Nicole Advisor no longer wishes to utilize the centralized user authentication, workflow processing, and data management offered by the centralized application 135, she can end her account access to the centralized application 135 yet still retain her separate user access to the first and second-third party applications 145 and 155 and related databases 147 and 157. She would no longer receive the benefits that the centralized application 135 provides, but an advantage of this example is that she can retain her independence from the centralized application 135 by always having the option to continue her use of the separate applications 145 and 155 as stand-alone applications and always having her accumulated data in the databases 147 and 157 associated with the third-party applications 145 and 155 preserved.

Figure 4:
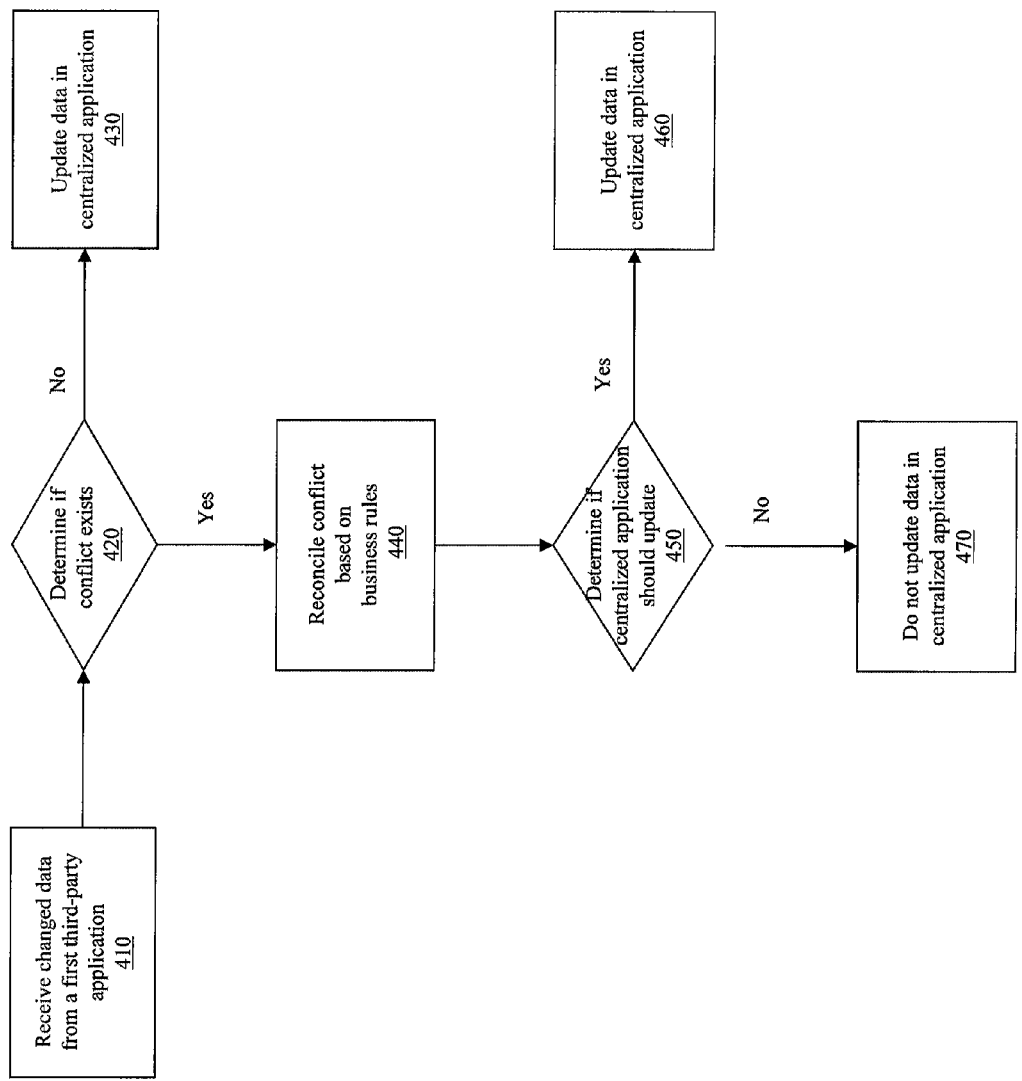
FIG. 4 is an exemplary flowchart for determining a conflict between changed data and data associated with the centralized application and reconciling the conflict according to at least one business rule.

FIG. 4. is an exemplary flowchart for determining (420) a conflict between changed data and data associated with the centralized application 135 and reconciling (430) the conflict according to at least one business rule. The centralized application 135 receives (410) changed data from a first third-party application 145. The centralized application 135 determines (420) if a conflict exists between the changed data and data associated with the centralized application 135, which can be stored in a centralized database 137. Conflicts between data can arise, for example, if the changed data includes a data value that the centralized application 135 maintains exclusively (e.g., username of the centralized database 137 administrator), if the changed data includes a data value over which the centralized application 135 wants to retain ownership (e.g., customer account number), or if the changed data includes a data value over which the centralized application 135 wants another third-party application 145 and 155 to retain ownership. Another example of a conflict is if the changed data includes a data value that has a timestamp that is earlier than the corresponding timestamp for that data value in the centralized application 135. The centralized application 135 can contain business rules which reconcile (440) the conflict between the changed data and the centralized application 135, and determine (450) whether it should update data in the centralized application 135 accordingly. Business rules can include, for example, data priority assessments, application priority assessments, workflow constraints, reconciliation of different data definitions, and data ownership hierarchies.

For example, the centralized application 135 receives (410) changed data from a first third-party application 145. The changed data includes a customer account number, and the centralized application 135 also maintains a data value for the customer account number. The centralized application 135 determines (420) that a conflict exists between the changed data and data associated with the centralized application 135. The centralized application 135 then reconciles (430) the conflict according to at least one business rule. The centralized application 135 can then determine (450) if it should update data in a database 137 associated with the centralized application 135 and either update (460) or not update (470) the data accordingly. The business rule, for example, can state that the centralized application 135 should never update the customer account number based on changed data received from any third-party application 145 (i.e., the centralized application 135 "owns" the customer account number). In another example, the business rule can state that the centralized application 135 should always update the customer account number based on changed data from a first third-party application 145, but never update the customer account number based on changed data from a second third-party application 155.

Figure 5:
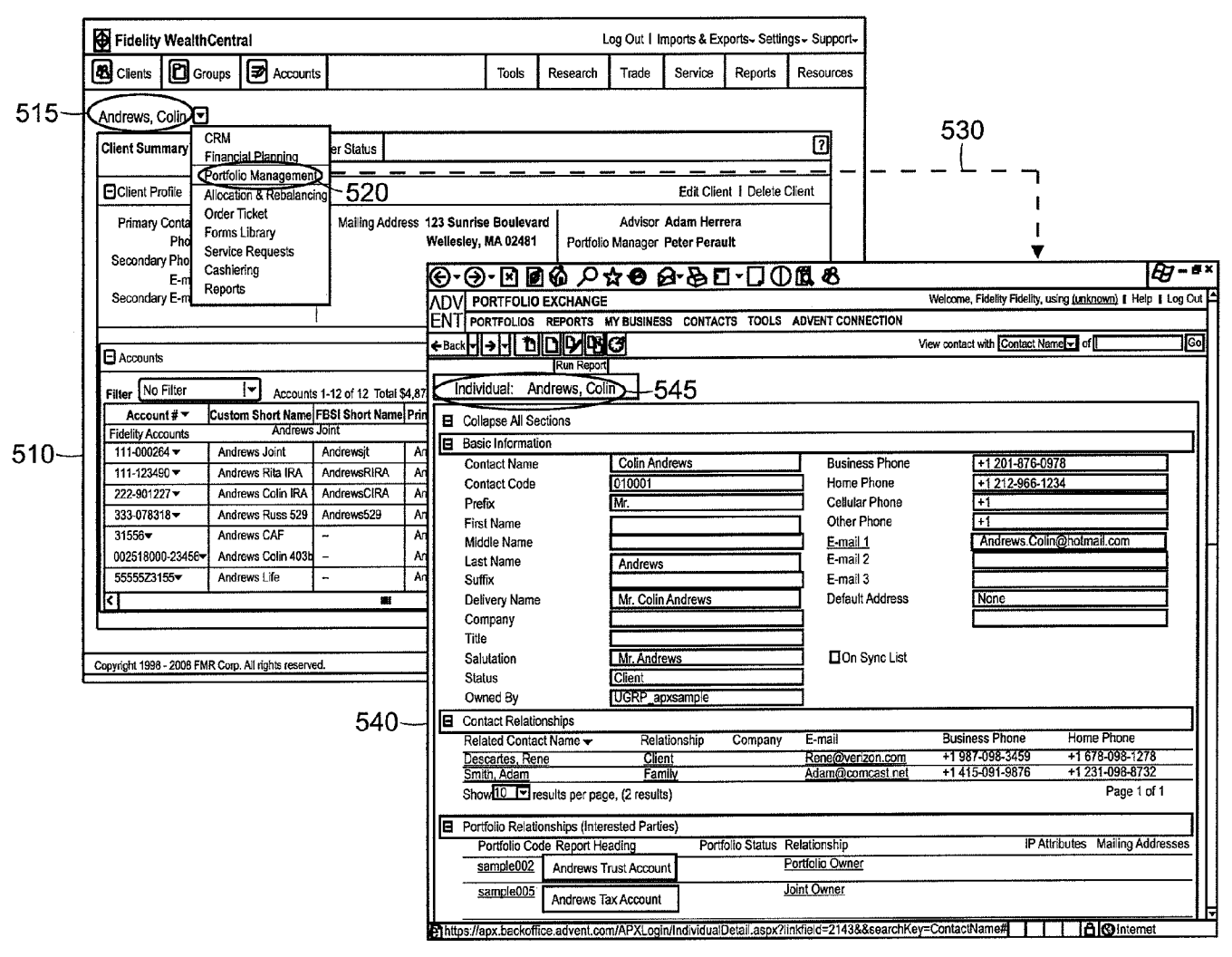

FIG. 5 is an exemplary screenshot for configuring the user interface 540 of a third-party application 145 to display information associated with context data 515 from the centralized application 135. The user interface 510 of the centralized application 135 is presented to the user 110 on a computing device 115. The user interface 510 displays summary data associated with a specific client 515 of the user 110 (e.g., the client, Colin Andrews). The user 110 can generate a user request by selecting a menu option 520 associated with a user interface 540 of the third-party application 145. The user request can include the third-party application 145, context data 515 associated with the centralized application 135, or both. The centralized application 135 receives the user request and sends the request to the third-party application 145. The third-party application 145 generates a separate user interface 540 and displays the user interface 540 on the computing device 115 of the user 110 (e.g., a separate Web browser window pops up on the user's screen). The user interface 540 of the third-party application 145 displays information associated with the context data 515 and without requiring any additional user input. The context data 515 can include, for example, account data (e.g., a Fidelity brokerage account, a third-party mutual find account), person data (e.g., a client, a prospect), group data (e.g., Aggressive Growth accounts, composite group accounts), and/or household data (e.g., a father and son's combined information).

For example, Nicole Advisor has logged in to the centralized application 135 and is perusing the client profile of her client Colin Andrews. She wants to review how his portfolio has performed over the last three months prior to a scheduled telephone call with him. She can click on the context of the page—in this case, his name 515—and select the Portfolio Management option 520 from the drop-down menu that appears. Upon clicking the Portfolio Management option 520, a user request is generated that can include the third-party application (e.g., Portfolio Management) and the context data 515 of the centralized application 135 (e.g., Colin Andrews). As an example, the centralized application 135 sends this request 530 to the Portfolio Management application which would generate a user interface 540 containing information related to Colin Andrews. A separate Web browser 540 containing the user interface 540 of the Portfolio Management application would appear and display the information at the computing device 115 of the user 110. The information displayed would be in the same context 545 as the user interface 510 of the centralized application 135, thereby relieving Nicole of the burden of having to find the pertinent page for Colin Andrews in the Portfolio Management application.

Figure 6A:
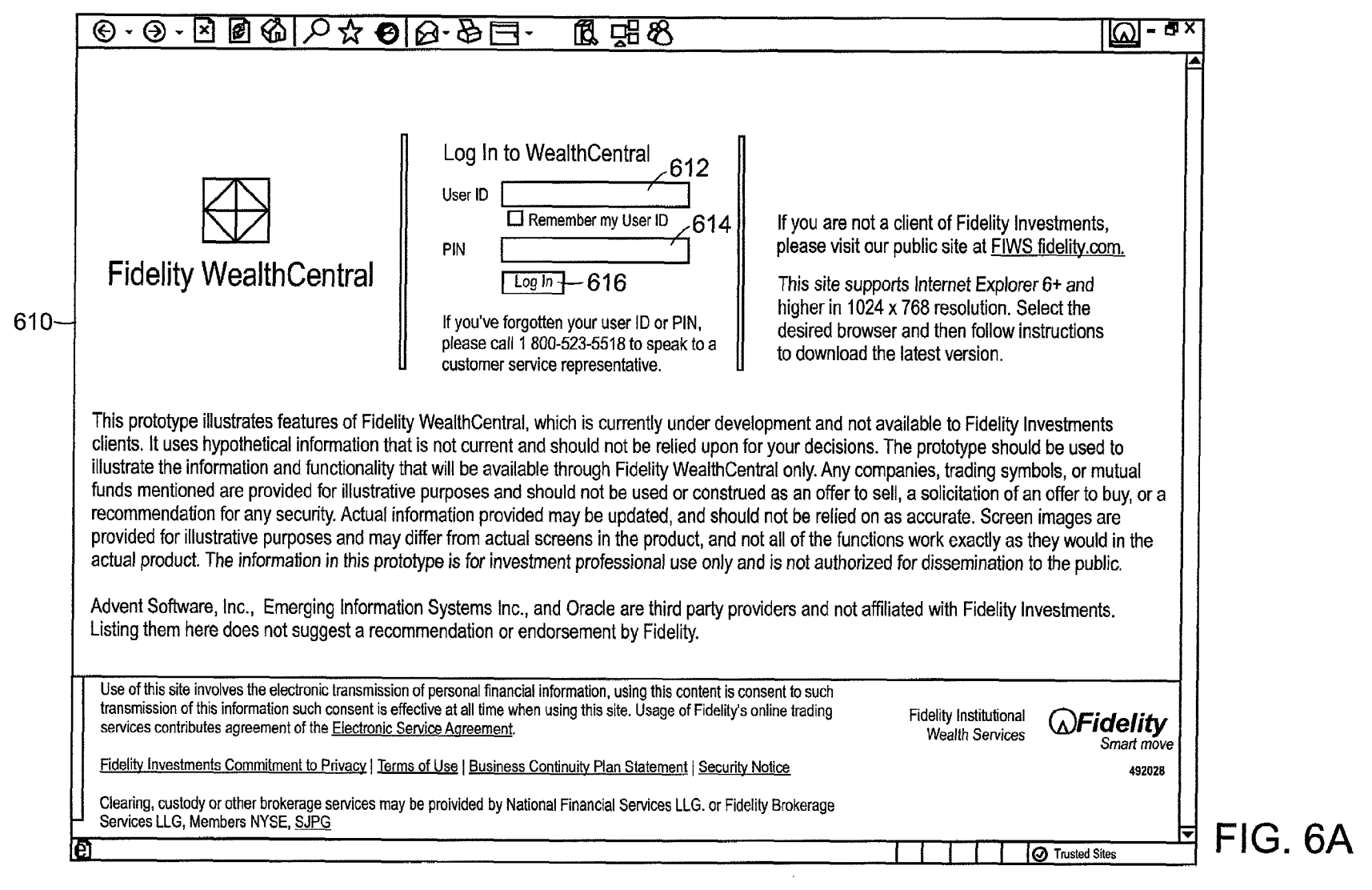
Figure 6C:
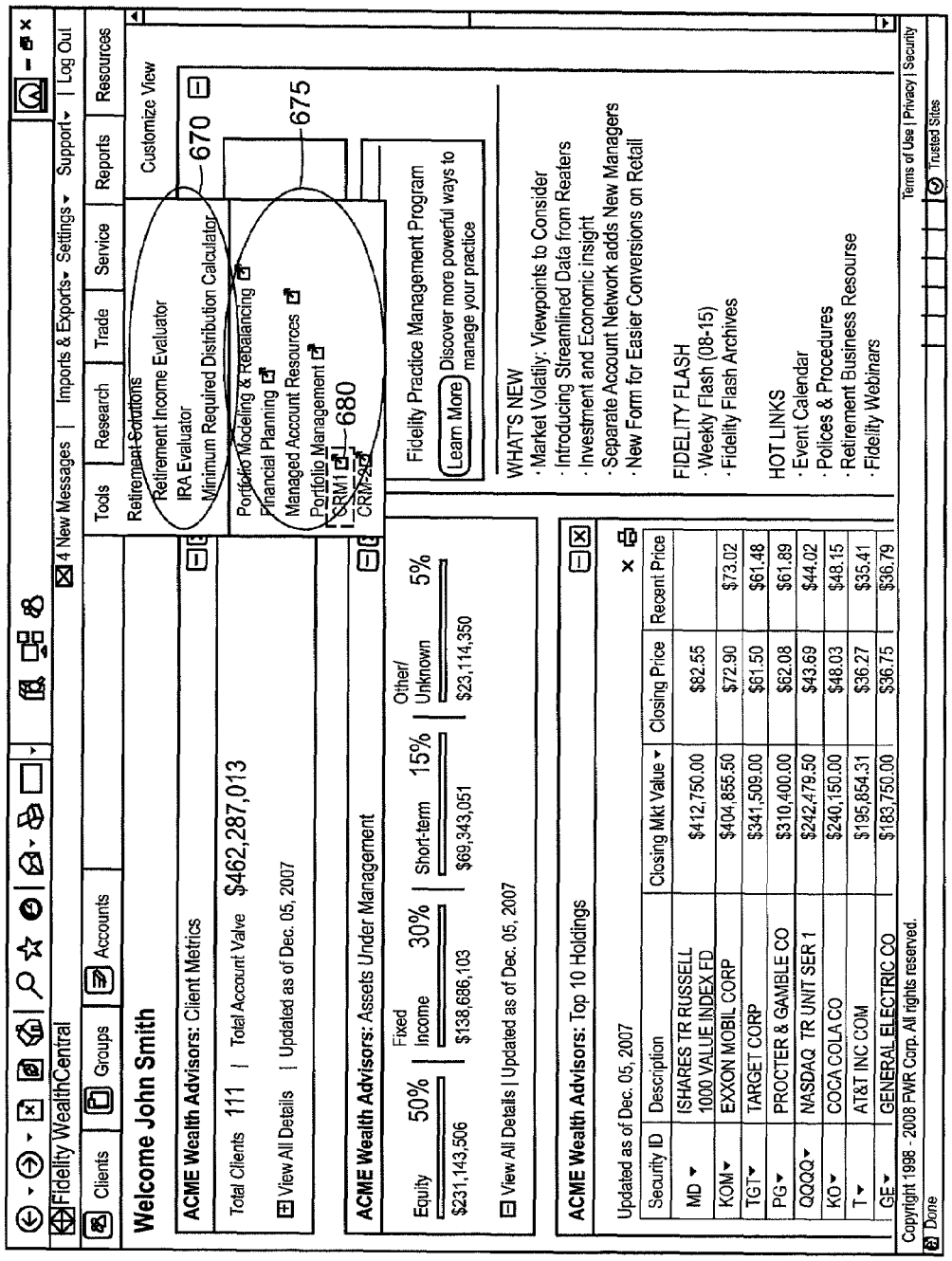

FIGS. 6A through 6C illustrate screenshots of an exemplary graphical user interface (GUI) generated by the centralized application 135. For communication with the centralized application 135 across the communications network 120, the graphical user interface can be loaded by a web browser such as Internet Explorer® by Microsoft® Corporation (www.microsoft.com).

Upon opening a web browser at a computing device 115 and entering the HTTP address of the centralized application 135, the user 110 is presented with a log-in screen 610, as seen in FIG. 6A. The log-in screen 610 contains text input boxes 612 and 614 for the user to enter a user ID and PIN, and a button 616 to log-in to the centralized application 135. When the user 110 clicks the log-in button 616, the centralized application 135 authenticates her access to the centralized application 135 and determines her user credentials associated with a plurality of third-party applications 145 and 155 without any additional input by the user 110.

FIG. 6B is an exemplary screenshot of the home page 620 of the centralized application 135. In this example, the advisor is greeted with a welcome message 622 including the advisor's name (e.g., John Smith) at the top of the screen. In this example, the screen displays a client summary section 624, an assets under management section 626, a top-ten holdings section 628, and a news and events section 630. Each section 624 through 628 contains information pertaining to this advisor's client base and scope of management. The screen also displays a series of functional menus 640 in the upper right-hand corner (e.g., Tools, Research, Trade, etc.) from which the advisor can select links to other functionality within the centralized application 135, or can alternatively select links to different third-party applications 145 and 155. In addition, the screen displays a series of context tabs 650 in the upper left-hand corner (e.g., Clients, Groups, Accounts) from which the advisor can drill down into more detailed views of the financial data based upon the context selected.

FIG. 6C is an exemplary screenshot showing an example of one of the functional drop-down menus 640. The menus can contain, for example, a variable number of menu options 670 and 675, from one to five to twenty-five to two-hundred and five. Here, the advisor clicks on the Tools menu 640 and receives a menu of options 670 and 675 from which he can select. In this example, some of the options include functionality 670 within the centralized application (e.g., Retirement Income Evaluator, IRA Evaluator, Minimum Required Distribution Calculator) which do not have a link icon 680 appended to the option name. However, some of the menu options are links 675 to third-party applications (e.g., Portfolio Modeling and Rebalancing, Financial Planning, Managed Account Resources, Portfolio Management, CRM, CRM2) which do have a link icon 680 appended to the option names. The link icon 680 could be used to identify to the user 110 which menu options will operate to access separate third-party applications 145 and 155. For example, when the user 110 clicks on a menu option to which the link icon 680 is appended, a user request that includes a third-party application 145 and context data of the centralized application 135 can be generated. The third-party application 145 can generate a user interface containing information related to the context data. The user interface can be displayed on the computing device 115 of the user 110.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose circuitry. The circuitry can, for example, be a FPGA (field programmable gate array), an ASIC (application-specific integrated circuit), or the like. Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by and/or incorporated in special purpose logic circuitry.

To provide for interaction with a user, the above described techniques can be implemented on a computer having a display device or a transmitting device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft® Corporation, Mozilla® Firefox available from Mozilla® Corporation). The mobile computing device includes, for example, a Blackberry®.

The web servers can be, for example, a computer with a server module (e.g., Microsoft® Internet Information Services available from Microsoft® Corporation, Apache Web Server available from Apache Software Foundation, Apache Tomcat Web Server available from Apache Software Foundation).

The databases can be, for example, a computer with a server module (e.g., Microsoft® SQL Server 2008 available from Microsoft® Corporation and/or Oracle® Database 11g available from Oracle® Corporation).

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network).

The system can include clients and servers. A client and a server are generally remote from each other and typically interact through a communication network. The relationship of client and server arises by virtue of computer programs running on the respective computers and having a client-server relationship to each other.

The above described communications networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

We claim:

1. A computerized method for context-based user authentication, workflow processing and data management in a centralized application in communication with a plurality of third-party applications, the method comprising:
    receiving, by a centralized application executing on a first application server, a user request from a first third-party application executing on a second application server, the request including an identification of a second third-may application executing on a third application server and context data of the first third-party application, the second third-party application providing different functionality than the first third-party application;
    determining, by the centralized application, user credentials associated with the second third-party application without any additional user input, and sending the credentials to the second third-party application for allowing user access to the second third-party application;
    displaying, by the centralized application, a user interface associated with the identified second third-party application on a client device the user interface configured to include information related to the context data without any user input;
    receiving, by the centralized application, changed data from the first third-party application; and
    determining, by the centralized application, an urgency type of the changed data,
    determining, by the centralized application, that at least a portion of the changed data is applicable to the second third-party application,
    mapping, by the centralized application, the at least a portion of the changed data to a data structure associated with the second third-party application,
    generating, by the centralized application, a request based on the urgency type and the second third-party application, the request including the data structure for updating a database associated with the second third-party application and coupled to the third computing device,
    sending, by the centralized application, the request to the second third-party application based on the urgency type, and
    updating, by the centralized application, data in a database associated with the centralized application, the updating being based on the changed data.

2. The method of claim 1, further comprising determining, by the centralized application, user access to data structures and/or functionality associated with the second third-party application.

3. The method of claim 1, wherein the context data comprises account data, person data, group data, household data, or any combination thereof.

4. The method of claim 3, wherein the urgency type is a real-time type, the
    sending step comprising sending the data to the second third-party application substantially instantaneously.

5. The method of claim 1, wherein the database associated with the centralized application comprises a subset of data common to the centralized application, the first third-party application, and the second third-party application.

6. The method of claim 1, wherein the first third-party application includes a customer relationship management application, a financial planning application, a portfolio management application, a modeling and/or rebalancing application, or any combination thereof.

7. The method of claim 1, wherein the urgency type comprises a batch type, an on-demand type, a real-time type, or any combination thereof.

8. The method of claim 1, wherein determining the urgency type comprises determining the urgency type based on at least one business rule.

9. The method of claim 1, wherein the urgency type is a batch type, the
    sending step comprising sending the data to the second third-party application at a later time.

10. The method of claim 1, wherein the urgency type is an on-demand type, the
    sending step comprising sending the data to the second third-party application upon a request for the data from the second third-party application.

11. The method of claim 1, wherein updating data in a database associated with the centralized application comprises mapping at least a portion of the changed data to a data structure associated with the centralized application.

12. The method of claim 1, wherein the centralized application, the first third-party application, and the second third-party application are owned and/or hosted by separate unrelated entities.

13. The method of claim 1, wherein the centralized application, the first third-party application, and the second third-party application communicate across a communications network.

14. The method of claim 1, wherein the first third-party application stores data in a corresponding database coupled to the second computing device.

15. The method of claim 1, further comprising:
receiving requests from a plurality of third-party applications; and
sending data to a plurality of third-party applications using a Web Services paradigm.

16. The method of claim 1, further comprising:
determining, by the centralized application, a conflict between the changed data and data associated with the centralized application; and
reconciling, by the centralized application, the conflict according to at least one business rule.

17. The method of claim 1, further comprising enabling separate user access to databases associated with the first third-party application and the second third-party application without first requiring user access to the centralized application.

18. The method of claim 1, further comprising:
receiving, by the centralized application, data from the first and/or second third-party application; and
filling, by the centralized application, a pre-defined form in the centralized application with said data and without any user input.

19. A computer program product, tangibly embodied in non-transitory computer readable storage device, for context-based user authentication, workflow processing and data management in a centralized application in communication with a plurality of third-party applications, the computer program product including instructions being operable to cause a first application server to:
receive by a centralized application executing on the first application server a user request from a first third-party application executing on a second application server, the request including an identification of a second third-party application executing on a third application server and context data of the first third-party application, the second third-party application providing different functionality than the first third-party application;
determine, by the centralized application, user credentials associated with the second third-party application without any additional user input, and sending the credentials to the second third-party application for allowing user access to the second third-party application;
display, by the centralized application, a user interface associated with the second third-party application on a client device, the user interface configured to include information related to the context data without any user input;
receive, by the centralized application, changed data from the first third-party application;
determine, by the centralized application, an urgency type of the changed data,
determine, by the centralized application, that at least a portion of the changed data is applicable to the second third-party application,
map, by the centralized application, the at least a portion of the changed data to a data structure associated with the second third-party application,
generate, by the centralized application, a request based on the urgency type and the second third-party application, the request including the data structure for updating a database associated with the second third-party application and coupled to the third application server,
send, by the centralized application, the request to the second third-party application based on the urgency type, and
update, by the centralized application, data in a database associated with the centralized application, the updating being based on the changed data.

20. A system for context-based user authentication, workflow processing and data management in a centralized application in communication with a plurality of third-party applications, the system comprising:
a first application server executing the centralized application, the first application server configured to:
receive a user request from a first third-party application executing on a second application server, the request including an identification of a second third-party application excuting on a third application and context data of the first third-party application, the second third-party application providing different functionality than the first third-party application;
determine user credentials associated with the second third-party application without any additional user input, and sending the credentials to the second third-party application for allowing user access to the second third-party application;
display a user interface associated with the identified second third-party application on a client device, the user interface configured to include information related to the context data without any user input;
determine an urgency type of the changed data,
determine that a second third-party application executing on a second server to which at least a portion of the changed data is applicable, the second third-party application providing different operations than the first third-party application, and owned or hosted by a different business entity then the first third-party application,
map at least a portion of the changed data to a data structure associated with the second third-party application,
generate a request based on the urgency type and the second third-party application, said request including the data structure for updating a database associated with the second third-party application and coupled to the second server and coupled to the third application server,
send the request to the second third-party application, and
update data in a database associated with the centralized application, said updating based on the changed data.

* * * * *

UNITED STATES PATENT AND TRADEMARK OFFICE
CERTIFICATE OF CORRECTION

| | | |
|---|---|---|
| PATENT NO. | : 8,131,666 B2 | |
| APPLICATION NO. | : 12/255590 | |
| DATED | : March 6, 2012 | |
| INVENTOR(S) | : Edward O'Brien et al. | |

It is certified that error appears in the above-identified patent and that said Letters Patent is hereby corrected as shown below:

Claim 1, Column 15, Line 49, after "third-" delete "may" and replace with --party--

Claim 1, Column 15, Line 61, after "device" add --,--

Claim 19, Column 17, Line 30, after "receive" add --,--

Claim 19, Column 17, Line 31, after "server" add --,--

Claim 20, Column 18, Line 24, delete "excuting" and replace with --executing--

Claim 20, Column 18, Line 25, after "application" add --server--

Signed and Sealed this
Fifteenth Day of May, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,131,666 B2 | Page 1 of 1 |
| APPLICATION NO. | : 12/255590 | |
| DATED | : March 6, 2012 | |
| INVENTOR(S) | : O'Brien et al. | |

It is certified that error appears in the above-identified patent and that said Letters Patent is hereby corrected as shown below:

In the Claims

Column 15, line 65, claim 1 delete "and"

Column 15, line 57, claim 1 delete "," and add --;--

Column 16, line 3, claim 1 delete "," and add --;--

Column 16, line 6, claim 1 delete "," and add --;--

Column 16, line 11, claim 1 delete "third computing device," and add --third application server;--

Column 16, line 14, claim 1 delete "," and add --;--

Column 16, line 67, claim 14 delete "second computing device" and add --second application server--

Column 17, line 25, claim 19 before "non-transitory" add --a--

Column 18, line 41, claim 20 delete "then" and add --than--

Signed and Sealed this
Twenty-second Day of September, 2015

Michelle K. Lee
*Director of the United States Patent and Trademark Office*